(12) United States Patent
Saklikar et al.

(10) Patent No.: US 11,075,947 B2
(45) Date of Patent: Jul. 27, 2021

(54) VIRTUAL TRAFFIC DECOYS

(71) Applicant: Cisco Technology, Inc., San Jose, CA (US)

(72) Inventors: Samir Dilipkumar Saklikar, Bangalore (IN); Vishnu V P, Bengaluru (IN); Srivatsa M S, Bengaluru (IN); Pujitha Venkata Saranya Eedupalli, Bengaluru (IN); Hrvoje Dogan, Singapore (SG)

(73) Assignee: CISCO TECHNOLOGY, INC., San Jose, CA (US)

( * ) Notice: Subject to any disclaimer, the term of this patent is extended or adjusted under 35 U.S.C. 154(b) by 351 days.

(21) Appl. No.: 16/018,257

(22) Filed: Jun. 26, 2018

(65) Prior Publication Data

US 2019/0394237 A1 Dec. 26, 2019

(51) Int. Cl.
| | |
|---|---|
| H04W 12/12 | (2021.01) |
| G06F 21/55 | (2013.01) |
| G06F 21/56 | (2013.01) |
| H04L 29/06 | (2006.01) |
| H04L 12/26 | (2006.01) |
| H04L 12/58 | (2006.01) |
| H04L 29/08 | (2006.01) |

(52) U.S. Cl.
CPC .......... H04L 63/1491 (2013.01); H04L 43/04 (2013.01); H04L 51/12 (2013.01); H04L 63/00 (2013.01); H04L 63/1416 (2013.01); H04L 63/1433 (2013.01); H04L 67/02 (2013.01); H04L 69/16 (2013.01); H04L 63/145 (2013.01)

(58) Field of Classification Search
None
See application file for complete search history.

(56) References Cited

U.S. PATENT DOCUMENTS

| | | | |
|---|---|---|---|
| 9,009,829 | B2 | 4/2015 | Stolfo et al. |
| 10,574,698 | B1 * | 2/2020 | Sharifi Mehr ...... H04L 63/1491 |
| 2002/0066034 | A1 | 5/2002 | Schlossberg et al. |
| 2004/0078592 | A1 | 4/2004 | Fagone et al. |
| 2007/0261112 | A1 | 11/2007 | Todd et al. |
| 2009/0241191 | A1 | 9/2009 | Keromytis et al. |
| 2010/0067377 | A1 * | 3/2010 | Wang .................. H04L 63/1441 370/230 |
| 2014/0096229 | A1 | 4/2014 | Burns et al. |
| 2016/0080414 | A1 | 3/2016 | Kolton et al. |
| 2017/0126706 | A1 * | 5/2017 | Minea ................. H04L 63/1416 |
| 2018/0375897 | A1 * | 12/2018 | Kawasaki ........... H04L 63/1491 |

* cited by examiner

*Primary Examiner* — Morshed Mehedi
*Assistant Examiner* — Kalish K Bell
(74) *Attorney, Agent, or Firm* — Edell, Shapiro & Finnan, LLC

(57) ABSTRACT

A network security method is provided. The method includes obtaining, at a network security device, first network traffic from a network device destined for a potential attacker; determining if the first network traffic is suspicious; when the first network traffic is determined to be suspicious: generating second network traffic based on the context of the network device and the first network traffic; providing the second network traffic to the potential attacker; obtaining, from the potential attacker, third network traffic in response to the second network traffic; and designating the potential attacker as malicious based on the third network traffic is disclosed. An apparatus and one or more non-transitory computer readable storage media are also disclosed.

20 Claims, 4 Drawing Sheets

VIRTUAL TRAFFIC DECOYS

TECHNICAL FIELD

The present disclosure relates to computer networking security.

BACKGROUND

The network security landscape is quickly evolving as attackers use new and sophisticated attacks. In general, network security solutions adopt a defensive approach to attacks. The defensive approach results in analyzing each user or network transaction against a set of configured or learned rules. These network security solutions wait until an attack can be identified. Until there is an attack, these network security solutions spend compute cycles to continuously identify and classify suspicious activity. In contrast, attackers are constantly trying to identify network security vulnerabilities. Therefore, attackers wait for a vulnerable client to make a connection before launching an attack. Therefore, network security solutions spend more compute cycles identifying each transaction while the attacker spends minimal compute cycles waiting for an attack opportunity.

DESCRIPTION OF EXAMPLE EMBODIMENTS

Overview

Broadly, this disclosure is directed to a system for using a virtual traffic decoy to entice or bait a potential attacker to launch an attack. The system includes a network security device, which may run or execute a security product function (a software or hardware function) and virtual traffic decoy trigger logic. The network security device receives network traffic from a network device destined for the potential attacker. The security product function analyzes the network traffic to determine if the network traffic is safe or unsafe. When the security product function is unable to determine if the network traffic is safe or unsafe, the security product function classifies the network traffic as suspicious. When the network traffic is suspicious, the virtual traffic decoy logic is triggered. The virtual traffic decoy trigger logic generates second network traffic based on the received network traffic and a context of the network device. The network security device sends the second network traffic to the potential attacker. The potential attacker responds with third network traffic. If the potential attacker is an actual attacker, the second network traffic may bait or entice the potential attacker to launch an attack via the third network traffic. The network security device receives and analyzes the third network traffic. If the third network traffic contains or indicates an attack, the network security device designates the potential attacker as malicious, and can thereafter take appropriate measures to prevent any further communications with the attacker.

Example Embodiments

Figure 1:
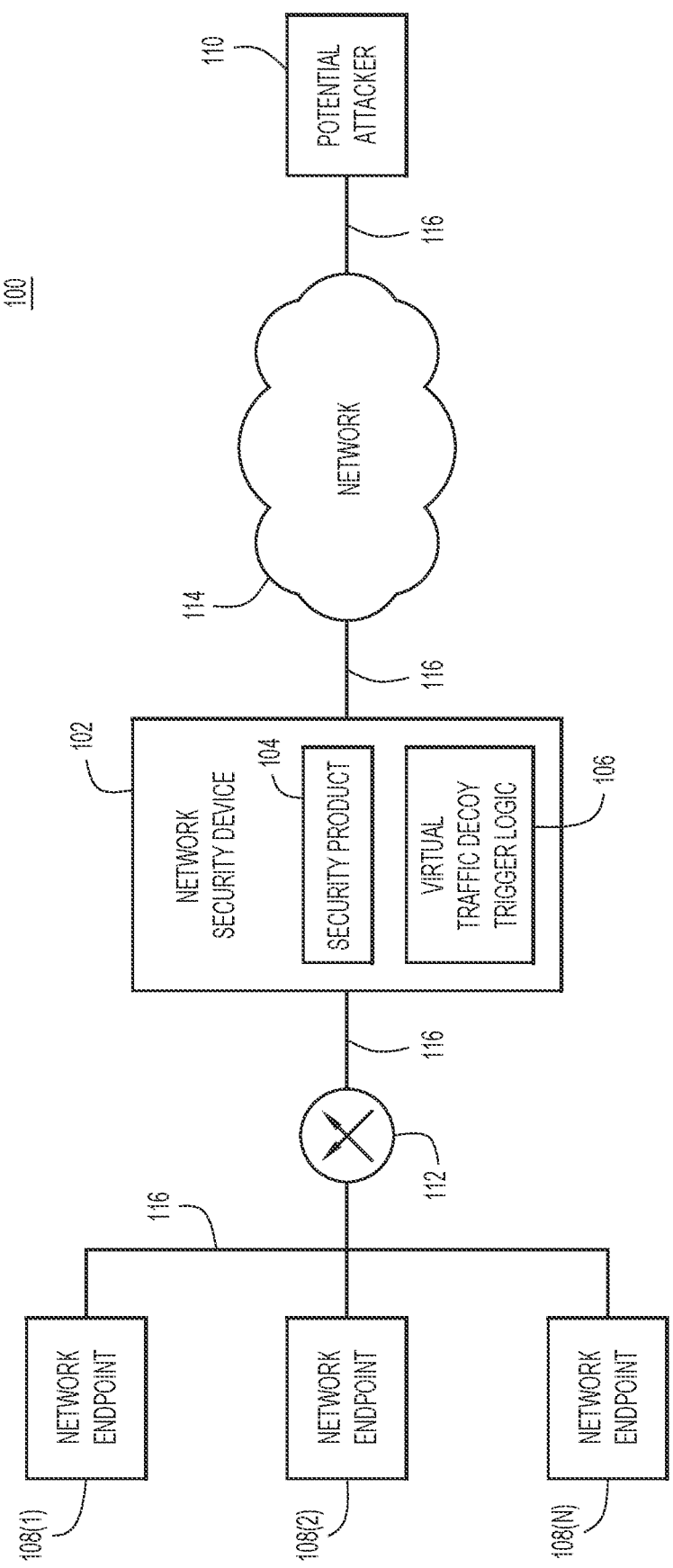
FIG. 1 is a block diagram of a computer network with a network security device using a virtual traffic decoy to provide network security, according to an example embodiment.

With reference made to FIG. 1, shown is a computer network 100 that includes a network security device 102 using a virtual traffic decoy to provide network security, according to an example embodiment. The network security device 102 may include a security product function 104 and virtual traffic decoy trigger logic 106. While FIG. 1 shows the security product function 104 and the virtual traffic decoy trigger logic 106 as separate, one of ordinary skill in the art should appreciate that the security product function 104 and the virtual traffic decoy trigger logic 106 may be integrated. Both the security product function 104 and the virtual traffic decoy trigger logic 106 are described in further detail herein. The computer network 100 also includes a plurality of network endpoints 108(1), 108(2) ... 108(N). A potential attacker 110 may have connectivity to one or more of the network endpoints 108(1)-108(N). The plurality of network endpoints 108(1)-108(N) may communicate with the network security device 102 via a network element 112, such as a router or a switch. The network security device 102 may communicate with the potential attacker 110 via a network 114. The network 114 may be any suitable computer network, such as a wide area network (WAN), a local area network (LAN), etc. Network links 116 may enable the network security device 102, the plurality of network endpoints 108(1)-108(N), the potential attacker, and the network element 112, and the network 114 to communicate with each other. The network links 116 may be wired, wireless, or a combination of wired and wireless.

The plurality of network endpoints 108(1)-108(N) may be any computing device, such as a personal computer, a mobile phone, a virtual desktop application running on a server, a server, etc. The network security device 102 may be any network device that protects the network, such as Internet security technology, email security technology, a firewall security appliance, an intrusion prevention device, etc. A network endpoint, such as network endpoint 108(1), may communicate with the potential attacker 110 via the network security device 102. The potential attacker 110 may be embodied by software running on a server and located anywhere in the world.

For example, network endpoint 108(1) may establish a connection to the potential attacker 110. Associated with this connection may be contextual information. The contextual information may include both real-time and historical data for when this particular network endpoint, here network endpoint 108(1), has established a connection with potential attacker 110. The contextual information associated with the connection between the network endpoint 108(1) and the potential attacker 110 may be organized into a contextual map. The contextual map may also include network traffic flow information, protocol-level information, server certificates, vulnerabilities information, time data, and/or user information, as described in more detail herein.

In one aspect, network traffic sent from network endpoint 108(1) to the potential attacker 110 may first be sent to the network security device 102. The network security device 102 may be configured to run or execute the security product function 104. The security product function 104 may analyze the network traffic to determine if it is safe. If the security product function 104 determines that the network traffic is safe, then the network traffic between network endpoint 108(1) and the potential attacker 110 is permitted. However, if the security product function 104 determines that the network traffic is unsafe, then the network security device 102 may block the network traffic between the network endpoint 108(1) and the potential attacker 110. In some aspects, the security product function 104 may be unable to determine if the network traffic is safe or unsafe. Under such circumstances, the virtual traffic decoy trigger logic 106 may use one or more virtual traffic decoys to determine whether the network traffic is safe. A virtual traffic decoy may send different network traffic to the potential attacker 110 to entice or bait the potential attacker 110 into launching an attack. If there is such an attack, the security product function 104 may determine that the potential attacker 110 is an actual attacker and block further network traffic between network endpoint 108(1) and the potential attacker 110. However, if it is determined that there is no attack initiated by the potential attacker 110 based on the virtual traffic decoy, then the security product function 104 may temporarily or permanently allow network traffic between the network endpoint 108(1) and the potential attacker 110.

Figure 2:
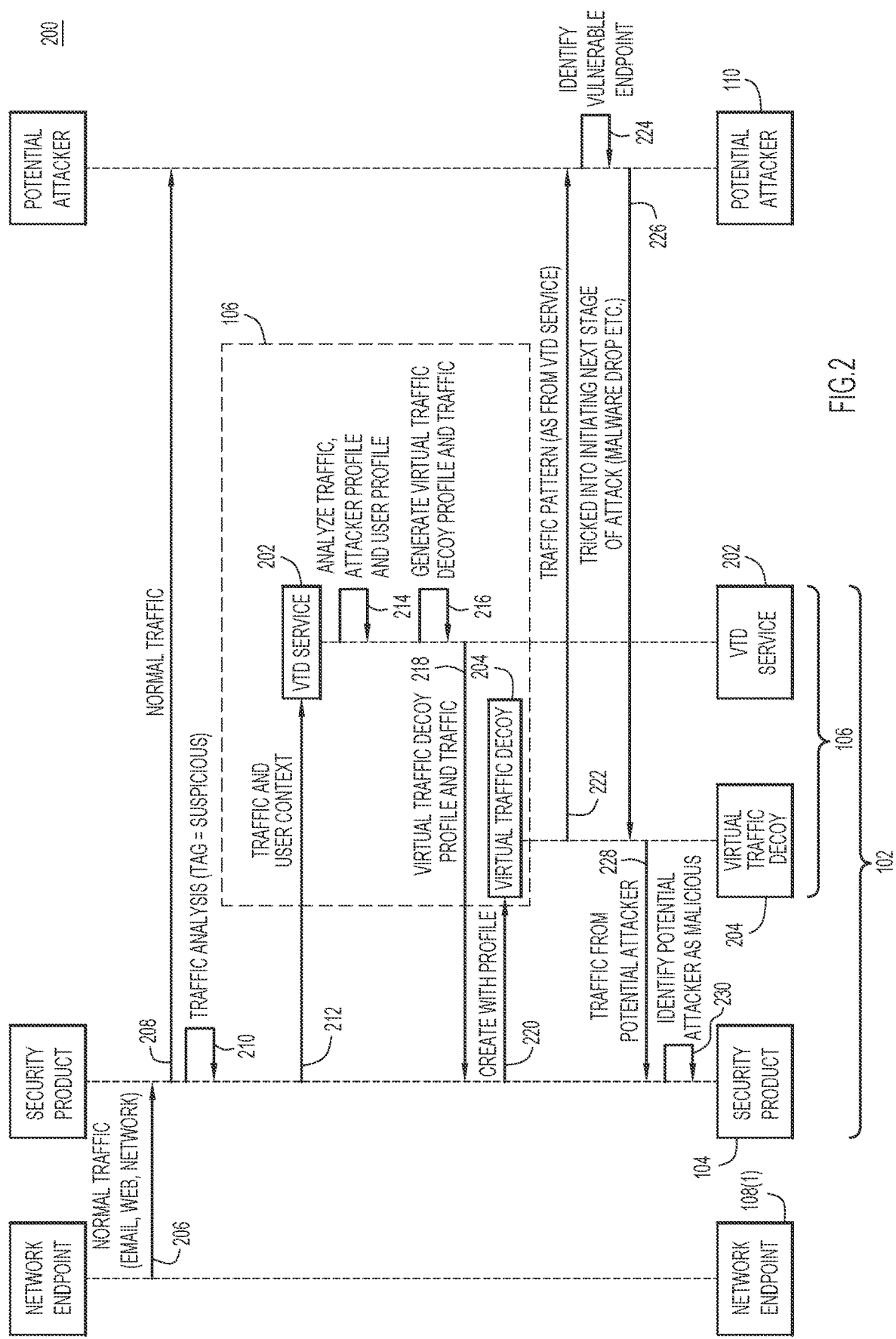
FIG. 2 is a sequence diagram depicting interactions between a network endpoint, a network security device, and a potential attacker, according to an example embodiment.

Turning next to FIG. 2, a sequence diagram 200 is shown depicting interactions between the network endpoint 108(1), the network security device 102, and the potential attacker 110, according to an example embodiment. The network security device 102 is shown with its components: the security product function 104 and the virtual traffic decoy trigger logic 106. The virtual traffic decoy trigger logic 106 is further shown as having two components: a virtual traffic decoy (VTD) service 202 and a virtual traffic decoy 204.

At 206, the network endpoint 108(1) may send first network traffic destined for the potential attacker 110 and this traffic is intercepted by the network security device 102. More specifically, the security product function 104 of the network security device 102 may receive the first network traffic.

At 208, the security product function 104 forwards the first network traffic to the potential attacker 110.

At 210, the security product 104 analyzes the first network traffic. This analysis may involve determining function whether a virtual traffic decoy should be used to determine if the potential attacker 110 is an actual attacker. This determination may be based on a variety of factors, such as the type of the first network traffic and known properties of the potential attacker 110.

When the security product function 104 determines that the first network traffic is safe, the security product function 104 allows the first network traffic to continue to the potential attacker 110. However, when the security product function 104 determines that the first network traffic is unsafe, the security product function 104 may warn a user of the network endpoint 108(1) and/or block the first network traffic from reaching the potential attacker 110. For example, the security product function 104 may analyze certificates, such as server certificates, to decide whether the potential attacker 110 is malicious. When the potential attacker 110 is determined to be malicious, the security product function 104 may determine that the first network traffic is unsafe. In some aspects, the security product function 104 may be unable to determine if the first network traffic is safe or unsafe based on insufficient information, etc. Under such circumstances, the security product function 104 may use a virtual traffic decoy to determine whether the first network traffic between the network endpoint 108(1) and the poten-tial attacker 110 may continue. The sequence diagram of FIG. 2 depicts when the security product function 104 is unable to determine whether the first network traffic is safe or unsafe. When the security product function 104 is unable to determine whether the first network traffic is safe or unsafe, the security product function 104 may tag or otherwise indicate that the first network traffic is suspicious.

At 212, the security product 104 may send and/or share the first network traffic and contextual information about the network endpoint 108(1) and the potential attacker 110 with the VTD service 202. Contextual information about the network endpoint 108(1) and potential attacker 110 may include activities the user of the network endpoint 108(1) performs with the potential attacker 110. For example, the user may engage in social networking activity at a certain time of day. Such contextual information may be useful to bait or entice the potential attacker 110 into launching a malicious attack.

At 214, the VTD service 202 may analyze the first network traffic and contextual information about the network endpoint 108(1) and the potential attacker 110. The contextual information about the network endpoint 108(1) and the potential attacker 110 may take the form of a user profile and a potential attacker 110 profile. The user profile may include current as well as previous network traffic received from the network endpoint 108(1), protocol-level information, vulnerabilities information, chronological data, and user information. For example, current and previous network traffic received from the network endpoint 108(1) may be used to generate synthetic network traffic, as described in more detail below. Protocol-level information may include information regarding the underlying communication protocol. Protocol-level information may appear as useful information to the potential attacker 110. The protocol-level information may be used to expose vulnerability information to the potential attacker 110. Vulnerabilities information may include possible vulnerabilities in an operating system and a browser of the network endpoint 108(1). The chronological data may include information about when the network endpoint 108(1) previously connected to the potential attacker 110. The user information may include information about which activities the user of the network endpoint 108(1) is performing with the potential attacker 110. The potential attacker 110 profile may include previous network traffic received from the potential attacker 110.

At 216, the VTD service 202 may generate a virtual traffic decoy profile and second network traffic. The virtual traffic decoy profile and the second network traffic may be based on the first network traffic, the potential attacker profile, and the user profile described with reference to operation 214. The virtual traffic decoy profile may include security vulnerabilities that may not actually be present in the network endpoint 108(1). For example, the VTD service 202 may generate the virtual traffic decoy profile using the contextual information described above. In one aspect, the VTD service 202 may use current and previous network traffic to generate the virtual traffic decoy profile and the second network traffic. For example, the second network traffic may be similar to the first network traffic as well as historical network traffic between the network endpoint 108(1) and the potential attacker 108. The second network traffic may include modifications that indicate that there is a security vulnerability. This indication may entice or bait the potential attacker 110 to launch an attack. In another aspect, the VTD service 202 may use the protocol-level information to generate second network traffic indicating security flaws. For example, Hypertext Transfer Protocol (HTTP) headers include information such as a user agent and cookie information for the network endpoint 108(1). The VTD service 202 may generate second network traffic by modifying the protocol-level information to mimic security flaws in order to entice or bait the potential attacker 110 to launch an attack. In another aspect, vulnerabilities information for a particular operating system and web browser combination may be used to generate a vulnerability in the virtual traffic decoy profile. For example, the network endpoint 108(1) may be using a version of a web browser with the most recent security updates. However, the vulnerabilities information may indicate that a previous version of the web browser may be vulnerable. The virtual traffic decoy profile and second network traffic may be generated to include the vulnerability of the previous version of the web browser to entice or bait the potential attacker 110. Additionally, the VTD service 202 may use the chronological data when generating the virtual traffic decoy profile and second network traffic. For example, the VTD service 202 may use information related to when the network endpoint 108(1) previously connected to the potential attacker 110. The VTD service 202 may then generate the virtual traffic decoy profile during the times the network endpoint 108(1) has previously connected with the potential attacker 110. Moreover, the VTD service 202 may use the user information to entice or bait the potential attacker 110. For example, the VTD service 202 may generate second network traffic to mimic similar user activity but with a browser that includes a vulnerability. The security vulnerability information may be obtained from a public and/or private database.

In one aspect, the VTD service 202 may generate a plurality of virtual traffic decoy profiles. Each of the virtual traffic decoy profiles may have a different set of vulnerabilities. By generating a plurality of virtual traffic decoy profiles, there is a greater chance of baiting or enticing the potential attacker 110 to launch an attack. When there are a plurality of virtual traffic decoy profiles, there may also be a corresponding plurality of second network traffic flows.

At 218, the VTD service 202 sends or shares the generated virtual traffic decoy profile and second network traffic with the security product function 104.

At 220, the security product function 104 creates the virtual traffic decoy 204 based on the virtual traffic decoy profile received from the VTD service 202. The security product function 104 may create a virtual traffic decoy 204 for each virtual traffic decoy profile generated by the VTD service 202. The virtual traffic decoy 204 may be generated as a new virtual endpoint. The virtual traffic decoy 204 may then establish a new connection with the potential attacker 110. Alternatively, the virtual traffic decoy may be interjected as a proxy within the existing connection between the network endpoint 108(1) and the potential attacker 110.

At 222, the virtual traffic decoy 204 sends the second network traffic generated by the VTD service 202 at operation 216 to the potential attacker 110. As described above, the synthetic network traffic is configured to entice or bait the potential attacker 110 to launch an attack.

At 224, the potential attacker 110 analyzes the second network traffic and the properties of the virtual traffic decoy 204 to determine if the virtual traffic decoy 204 is vulnerable. If the potential attacker 110 is an actual attacker and identifies the virtual traffic decoy 204 as vulnerable, the potential attacker 110 may respond with third network traffic, which may include a malicious attack. If the potential attacker 110 is not an attacker, or if the potential attacker 110 does not identify the virtual traffic decoy 204 as vulnerable, the potential attacker 110 may reply with third network traffic, which is, in this case, would be benign network traffic. The sequence diagram 200 illustrates the sequence when the potential attacker 110 is an actual attacker and identifies the network traffic decoy 204 as vulnerable.

At 226, after the potential attacker 110 has identified the virtual traffic decoy 204 as vulnerable, the potential attacker 110 sends the third network traffic including malicious traffic to the virtual traffic decoy 204. The malicious traffic may include an attack, such as a malware drop or a redirect to a malicious Universal Resource Locator (URL).

At 228, the virtual traffic decoy 204 sends or shares the third network traffic received from the potential attacker 110 with the security product function 104 for analysis. When the virtual traffic decoy 204 is functioning as a proxy, the virtual traffic decoy 204 does not send the third network traffic received from the potential attacker 110 to the network endpoint 108(1). Rather, the virtual traffic decoy 204 sends the third network traffic received from the potential attacker 110 to the security product function 104.

At 230, the security product function 104 may analyze the third network traffic received from the potential attacker 110 to determine if the third network traffic is malicious. If the security product function 104 determines that the third network traffic is malicious, the security product function 104 may blacklist the potential attacker 110 as malicious and block all traffic to or from the potential attacker 110. However, if the third network traffic from the potential attacker 110 is not malicious, then the security product function 104 may determine that the potential attacker 110 is safe and temporarily remove it from a list of suspicious targets.

These techniques provide a variety of advantages. For example, the techniques reduce the waiting time for both the network security device 102 and the potential attacker 110 by using passive-offensive tactics to trigger an attack. Moreover the techniques take advantage of contextual information to generate the most relevant virtual traffic decoy profiles and second network traffic flows.

Moreover, these techniques do not include any real vulnerabilities. In contrast to "honeypot" solutions, which generally use a server farm to build a vulnerable network space, only the second network traffic indicates a vulnerability. Because there are no real vulnerabilities, the system cannot be compromised by known vulnerabilities. Therefore, the techniques avoid concerns of malware infecting good endpoints, as is possible in honeypot solutions.

Figure 3:
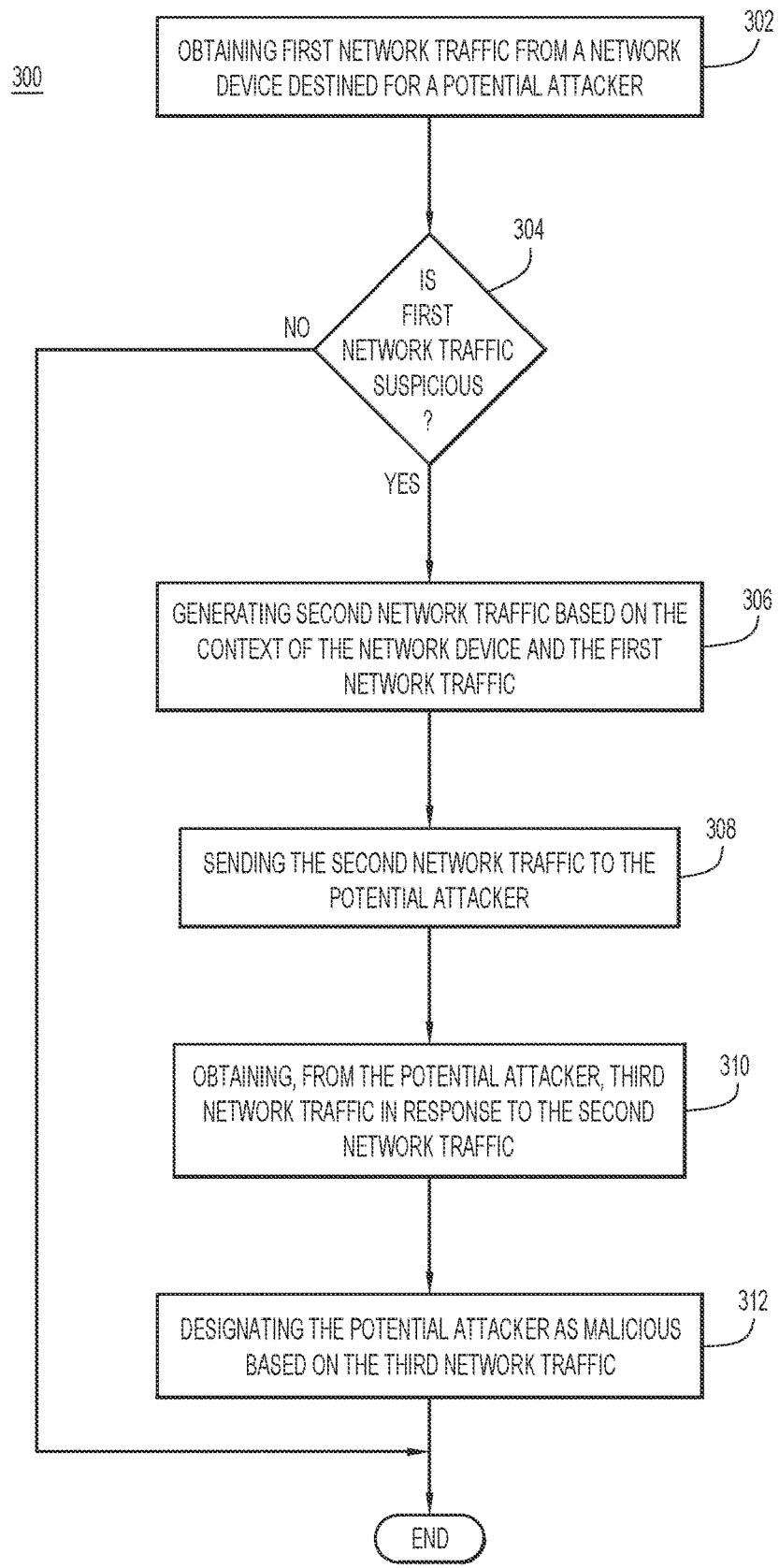
FIG. 3 is a flowchart of a method for enticing or baiting a potential attacker to launch an attack using a virtual traffic decoy at a network security device, according to an example embodiment.

Turning next to FIG. 3, and with continuing reference to FIGS. 1 and 2, shown is a flowchart of a method 300 for enticing or baiting the potential attacker 110 to launch an attack using a virtual traffic decoy 204 at a network security device 102, according to an example embodiment. At operation 302, the network security device 102 may obtain first network traffic from a network device, such as network endpoint 108(1), destined for a potential attacker, such as potential attacker 110. The first network traffic may correspond to the network traffic shown at 206 in FIG. 2. For example, a user of the network endpoint 108(1) may have been tricked into visiting a website, such as a social media and news aggregator website. The first network traffic may represent this connection. Normally, the user accesses this website from the user's corporate network with a web browser with the latest security update. Therefore, the new website, i.e., potential attacker 110, may decide not to launch an attack on the network endpoint 108(1) because the network endpoint 108(1) is not vulnerable.

At operation 304, the network security device 102 may determine if the first network traffic is suspicious. For example, the security product function 104 may be a network security solution. The security product function 104 may analyze the first network traffic to determine a level of risk associated with the first network traffic. For example, the security product function 104 may evaluate the first network traffic based on a reputation of the destination, here the potential attacker 110, and any available certificates, such as server certificates. The security product function 104 may determine that the first network traffic is suspicious even though the potential attacker 110 has not previously launched a malicious attack on the network endpoint 108(1). Moreover, the security product function 104 may also determine that the first network traffic is suspicious even in the absence of a malicious intent. When the security product function 104 determines that the first network traffic is not suspicious, the method 300 may end. Because the first network traffic is not suspicious, the first network traffic is known to be either benign or malicious. Therefore, the network security device 102 does not need to use the network traffic decoy techniques of this disclosure to determine whether the connection is safe or unsafe. However, when the security product function 104 determines that the first network traffic is suspicious, the method proceeds to operation 306.

At operation 306, the network security device 102 generates second network traffic based on the context of the network device 108(1), the potential attacker 110, and the first network traffic. For example, the network security device 102 may use the contextual map, which may include the contextual information over a period of time as described above, such as information for a particular user of the network endpoint 108(1), a browsing profile history, browser, signatures, network traffic patterns, and chronological information. The network security device 102 may modify the first network traffic using information in the contextual map to generate the second network traffic, which corresponds to the second network traffic described above in sequence 216. For example, the second network traffic may indicate that the second network traffic originated from a vulnerable web browser.

At operation 308, the network security device 102 sends the second network traffic to the potential attacker 110. As described, the second network traffic is configured to entice or bait the potential attacker 110 to launch an attack.

At operation 310, the network security device 102 receives, from the potential attacker 110, a third network traffic. The third network traffic is received in response to the second network traffic.

At operation 312, the network security device 102 designates the potential attacker 110 as malicious based on the third network traffic. For example, if the potential attacker 110 is an actual attacker, then the potential attacker 110 may have been enticed or baited to launch an attack. The third network traffic includes the attack. In contrast, if the potential attacker 110 has not been enticed or baited to launch an attack, the third network does not include an attack. The network security device 102, after analyzing the third network traffic and determining that it is malicious, may designate the potential attacker 110 as malicious. However, if the network security device 102 determines that the third network traffic is not malicious, the network security device 102 may not designate the potential attacker 110 as malicious. In certain embodiments, the network security device 102 may designate the potential attacker 110 as safe and/or remove the potential attacker 110 from a list of suspicious destinations.

Figure 4:
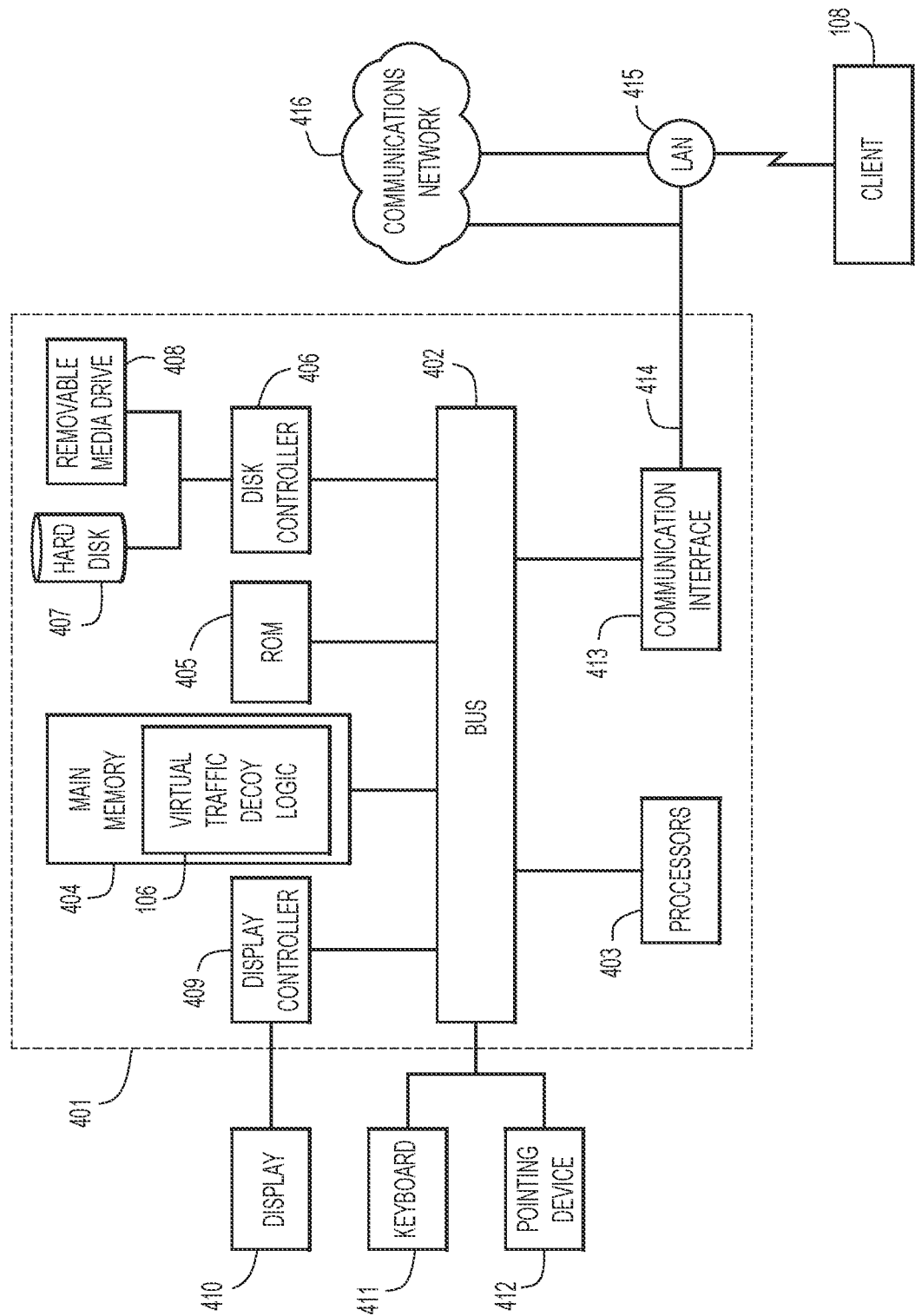
FIG. 4 is a block diagram of a network security device, according to an example embodiment.

FIG. 4 is a block diagram showing a network security device, e.g., network security device 102 shown in FIG. 1, configured to use virtual traffic decoys to protect a network endpoint, according to example embodiments described herein. FIG. 4 shows that the network security device may take the form of a computer system. The computer system 401 includes a bus 402 or other communication mechanism for communicating information, and a processor 403 coupled with the bus 402 for processing the information. While the figure shows a signal block 403 for a processor (e.g., microprocessor or microcontroller), it should be understood that the processors 403 represent a plurality of processing cores, each of which can perform separate processing. The computer system 401 also includes a main memory 404, such as a random access memory (RAM) or other dynamic storage device (e.g., dynamic RAM (DRAM), static RAM (SRAM), and synchronous DRAM (SD RAM)), coupled to the bus 402 for storing information and instructions to be executed by processor 403. In addition, the main memory 404 may be used for storing temporary variables or other intermediate information during the execution of instructions by the processor 403.

The computer system 401 further includes a read only memory (ROM) 405 or other static storage device (e.g., programmable ROM (PROM), erasable PROM (EPROM), and electrically erasable PROM (EEPROM)) coupled to the bus 402 for storing static information and instructions for the processor 403.

The computer system 401 may include a disk controller 406 coupled to the bus 402 to control one or more storage devices for storing information and instructions, such as a magnetic hard disk 407, and a removable media drive 408 (e.g., floppy disk drive, read-only compact disc drive, flash drive, read/write compact disc drive, and removable magneto-optical drive). The storage devices may be added to the computer system 401 using an appropriate device interface (e.g., small computer system interface (SCSI), integrated device electronics (IDE), enhanced-IDE (E-IDE), direct memory access (DMA), or ultra-DMA).

The computer system 401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 401 may also include a display controller 409 coupled to the bus 402 to control a display 410, such as a cathode ray tube (CRT), for displaying information to a computer user. The computer system 401 includes input devices, such as a keyboard 411 and a pointing device 412, for interacting with a computer user and providing information to the processor 403. The pointing device 412, for example, may be a mouse, a trackball, or a pointing stick for communicating direction information and command selections to the processor 403 and for controlling cursor movement on the display 410.

The computer system 401 performs a portion or all of the processing steps of the process in response to the processor 403 executing one or more sequences of one or more instructions contained in a memory, such as the main memory 404. Such instructions may be read into the main memory 404 from another computer readable medium, such as a hard disk 407 or a removable media drive 408. One or more processors in a multi-processing arrangement may also be employed to execute the sequences of instructions contained in main memory 404. In alternative embodiments, hard-wired circuitry may be used in place of or in combination with software instructions. Thus, embodiments are not limited to any specific combination of hardware circuitry and software.

As stated above, the computer system 401 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, Stored on any one or on a combination of non-transitory computer readable storage media, embodiments presented herein include software for controlling the computer system 401, for driving a device or devices for implementing the process, and for enabling the computer system 401 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 401 also includes a communication interface 413 coupled to the bus 402. The communication interface 413 provides a two-way data communication coupling to a network link 414 that is connected to, for example, a local area network (LAN) 415, or to another communications network 416 such as the Internet and ultimately to connect to a network endpoint shown generically at 108 in FIG. 4. For example, the communication interface 413 may be a wired or wireless network interface card having a plurality of ports configured to connect to any packet switched (wired or wireless) LAN. As another example, the communication interface 413 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 413 sends and receives electrical, electromagnetic or optical signals that carry digital data streams representing various types of information.

The network link 414 typically provides data communication through one or more networks to other data devices. For example, the network link 414 may provide a connection to another computer through a local area network 415 (e.g., a LAN) or through equipment operated by a service provider, which provides communication services through a communications network 416. The local network 414 and the communications network 416 use, for example, electrical, electromagnetic, or optical signals that carry digital data streams, and the associated physical layer (e.g., CAT 5 cable, coaxial cable, optical fiber, etc.). The signals through the various networks and the signals on the network link 414 and through the communication interface 413, which carry the digital data to and from the computer system 401 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 401 can transmit and receive data, including program code, through the network(s) 415 and 416, the network link 414 and the communication interface 413. Moreover, the network link 414 may provide a connection through a LAN 415 to a network endpoint 108 such as a personal computer, server, or cellular telephone.

In summary, in one example embodiment, a method is provided including obtaining, at a network security device, first network traffic from a network device (an endpoint on a network on a network or any network device in a network) destined for a potential attacker; determining if the first network traffic is suspicious; when the first network traffic is determined to be suspicious: generating second network traffic based on the context of the network device and the first network traffic; providing (sending) the second network traffic to the potential attacker; obtaining (receiving), from the potential attacker, third network traffic in response to the second network traffic; and designating the potential attacker as malicious based on the third network traffic is disclosed.

More specifically, the context of the network device is based on real-time and historical data of a connection between the network device and the potential attacker. Further, the second network traffic is configured to trigger an attack by the potential attacker by including at least one security vulnerability in the second network traffic.

In another embodiment, the method may also include generating fourth network traffic based on the context of the network device and the first network traffic and including at least one security vulnerability, the at least one security vulnerability of the second network traffic being different from the at least one security vulnerability of the fourth network traffic.

In another aspect, generating the second network traffic, providing the second network traffic, and obtaining, from the potential attacker, third network traffic is performed by a proxy between the network device and the potential attacker. Moreover, the network security device may prevent the third network traffic from being forwarded to the network device.

In another embodiment, the potential attacker is designated as malicious when the third network traffic includes a security attack.

In another aspect, the first network traffic is determined to be suspicious based on a profile of the potential attacker.

In another example embodiment, an apparatus is provided including a communication interface configured to enable network communications; a processing device coupled with the communication interface, and configured to: obtain first network traffic from a network device destined for a potential attacker; determine if the first network traffic is suspicious; when the first network traffic is determined to be suspicious: generate second network traffic based on the context of the network device and the first network traffic; provide (send) the second network traffic to the potential attacker; obtain, from the potential attacker, third network traffic in response to the second network traffic; and designate the potential attacker as malicious based on the third network traffic is disclosed.

In yet another example embodiment, one or more non-transitory computer readable storage media encoded with instructions that, when executed by a processor, cause the processor to: obtain first network traffic from a network device destined for a potential attacker; determine if the first network traffic is suspicious; when the first network traffic is determined to be suspicious: generate second network traffic based on the context of the network device and the first network traffic; provide (send) the second network traffic to the potential attacker; obtain, from the potential attacker, third network traffic in response to the second network traffic; and designate the potential attacker as malicious based on the third network traffic is disclosed.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    obtaining, at a network security device, first network traffic from a network device destined for a potential attacker;
    determining if the first network traffic is suspicious;
    when the first network traffic is determined to be suspicious:
       generating a plurality of virtual traffic decoy profiles, each including a different set of security vulnerabilities not present in the first network traffic from the network device;
       generating second network traffic based on the first network traffic, a context of the network device, and contextual information of the potential attacker, wherein the second network traffic includes a plurality of second network traffic flows generated using the plurality of virtual traffic decoy profiles such that each of the plurality of second network traffic flows is generated using a different one of the plurality of the virtual traffic decoy profiles;
       providing the second network traffic to the potential attacker;
       obtaining, from the potential attacker, third network traffic in response to the second network traffic; and
       designating the potential attacker as malicious based on the third network traffic.

2. The method of claim 1, wherein the context of the network device is based on real-time and historical data of a connection between the network device and the potential attacker.

3. The method of claim 1, wherein the second network traffic is configured to trigger an attack by the potential attacker by including or indicating at least one security vulnerability in the second network traffic.

4. The method of claim 3, further comprising:
    generating fourth network traffic based on the context of the network device and the first network traffic and including at least one other security vulnerability, the at least one security vulnerability of the second network traffic being different from the at least one other security vulnerability of the fourth network traffic.

5. The method of claim 1, wherein generating the second network traffic, providing the second network traffic, and obtaining, from the potential attacker, the third network traffic is performed by a proxy between the network device and the potential attacker, and further comprising:
    preventing, by the network security device, the third network traffic from being forwarded to the network device.

6. The method of claim 1, wherein the potential attacker is designated as malicious when the third network traffic includes or indicates a security attack.

7. The method of claim 1, wherein determining if the first network traffic is suspicious is based on a profile of the potential attacker that includes previous network traffic received from the potential attacker.

8. An apparatus comprising:
    a communication interface configured to enable network communications;
    a processing device coupled with the communication interface, and configured to:
       obtain first network traffic from a network device destined for a potential attacker;
       determine if the first network traffic is suspicious;
       when the first network traffic is determined to be suspicious:
          generate a plurality of virtual traffic decoy profiles, each including a different set of security vulnerabilities not present in the first network traffic from the network device;
          generate second network traffic based on the first network traffic, a context of the network device, and contextual information of the potential attacker, wherein the second network traffic includes a plurality of second network traffic flows generated using the plurality of virtual traffic decoy profiles such that each of the plurality of second network traffic flows is generated using a different one of the plurality of the virtual traffic decoy profiles;
          provide the second network traffic to the potential attacker;
          obtain, from the potential attacker, third network traffic in response to the second network traffic; and
          designate the potential attacker as malicious based on the third network traffic.

9. The apparatus of claim 8, wherein the context of the network device is based on real-time and historical data of a connection between the network device and the potential attacker.

10. The apparatus of claim 8, wherein the second network traffic is configured to trigger an attack by the potential attacker by including at least one security vulnerability in the second network traffic.

11. The apparatus of claim 10, wherein the processing device is further configured to:
    generate fourth network traffic based on the context of the network device and the first network traffic and including at least one other security vulnerability, the at least one security vulnerability of the second network traffic being different from the at least one other security vulnerability of the fourth network traffic.

12. The apparatus of claim 8, wherein the processing device is further configured to:

serve as a proxy between the network device and the potential attacker; and prevent the third network traffic from being forwarded to the network device.

13. The apparatus of claim 8, wherein the potential attacker is designated as malicious when the third network traffic includes a security attack.

14. The apparatus of claim 8, wherein the processing device is configured to determine if the first network traffic is suspicious is based on a profile of the potential attacker that includes previous network traffic received from the potential attacker.

15. One or more non-transitory computer readable storage media encoded with instructions that, when executed by a processor, cause the processor to:
   obtain first network traffic from a network device destined for a potential attacker;
   determine if the first network traffic is suspicious;
   when the first network traffic is determined to be suspicious:
      generate a plurality of virtual traffic decoy profiles, each including a different set of security vulnerabilities not present in the first network traffic from the network device;
      generate second network traffic based on the first network traffic, a context of the network device, and contextual information of the potential attacker, wherein the second network traffic includes a plurality of second network traffic flows generated using the plurality of virtual traffic decoy profiles such that each of the plurality of second network traffic flows is generated using a different one of the plurality of the virtual traffic decoy profiles;
      provide the second network traffic to the potential attacker;
      obtain, from the potential attacker, third network traffic in response to the second network traffic; and
      designate the potential attacker as malicious based on the third network traffic.

16. The computer-readable storage media of claim 15, wherein the context of the network device is based on real-time and historical data of a connection between the network device and the potential attacker.

17. The computer-readable storage media of claim 15, wherein the second network traffic is configured to trigger an attack by the potential attacker by including at least one security vulnerability in the second network traffic.

18. The computer-readable storage media of claim 17, wherein the instructions further cause the processor to:
   generate fourth network traffic based on the context of the network device and the first network traffic and including at least one other security vulnerability, the at least one security vulnerability of the second network traffic being different from the at least one other security vulnerability of the fourth network traffic.

19. The computer-readable storage media of claim 15, wherein the potential attacker is designated as malicious when the third network traffic includes or indicates a security attack.

20. The method of claim 1, wherein generating the second network traffic includes:
   generating the second network traffic that is similar to the first network traffic and historical network traffic between the network device and the potential attacker, wherein the contextual information of the network device is associated with a connection between the network device and the potential attacker and is organized in a contextual map.

* * * * *